United States Patent
Carey et al.

(10) Patent No.: US 10,255,917 B2
(45) Date of Patent: Apr. 9, 2019

(54) COORDINATING THE EXECUTION OF A VOICE COMMAND ACROSS MULTIPLE CONNECTED DEVICES

(71) Applicant: INTERNATIONAL BUSINESS MACHINES CORPORATION, Armonk, NY (US)

(72) Inventors: James E. Carey, Rochester, MN (US); Ryan K. Cradick, Oronoco, MN (US); Cory J. Kleinheksel, Ames, IA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/475,772

(22) Filed: Mar. 31, 2017

(65) Prior Publication Data
US 2018/0286391 A1   Oct. 4, 2018

(51) Int. Cl.
*G10L 15/22* (2006.01)
*G10L 15/30* (2013.01)
*G10L 21/02* (2013.01)

(52) U.S. Cl.
CPC .............. *G10L 15/22* (2013.01); *G10L 15/30* (2013.01); *G10L 21/0205* (2013.01); *G10L 2015/223* (2013.01); *G10L 2015/228* (2013.01)

(58) Field of Classification Search
CPC ....................................................... G10L 15/30
See application file for complete search history.

(56) References Cited

U.S. PATENT DOCUMENTS 6,330,539 B1 * 12/2001 Takayama ........... G10L 15/1822
704/251
7,050,796 B2 * 5/2006 Humphrey .......... H04M 1/7253
455/177.1
7,127,401 B2   10/2006 Miller
(Continued)

OTHER PUBLICATIONS

Anonymous, "Ad hoc microphone array calibration", http://dl.acm.org/citation.cfm?id=2802200.2802334, ACM Digital Library, Accessed Mar. 31, 2017, 2 pages.
(Continued)

*Primary Examiner* — Abul K Azad
(74) *Attorney, Agent, or Firm* — Jay Wahlquist; Andrew D. Wright; Roberts Mlotkowski Safran Cole & Calderon, P.C.

(57) ABSTRACT

A computer-implemented method includes exchanging device data, associated with a first participating user device, with the one or more second participating user devices; receiving audio data associated with a voice command; exchanging the audio data with the one or more second participating user devices; identifying, by the first participating user device, a voice command based on exchanging the audio data; determining which one of the first participating user device or the one or more second participating user devices should respond to the voice command based on details of the voice command and the exchanging the device data; responding to the voice command based on determining that the first participating user device should respond to the voice command; and signaling a particular second participating user device to respond to the voice command based on determining that the particular second participating user device should respond to the voice command.

16 Claims, 9 Drawing Sheets

(56) References Cited

U.S. PATENT DOCUMENTS

| | | | |
|---|---|---|---|
| 8,296,383 | B2 | 10/2012 | Lindahl |
| 8,676,904 | B2 | 3/2014 | Lindahl |
| 8,924,219 | B1 | 12/2014 | Bringert et al. |
| 9,368,105 | B1 | 6/2016 | Freed et al. |
| 2007/0024579 | A1 | 2/2007 | Rosenberg |
| 2016/0078870 | A1 | 3/2016 | Helm |
| 2016/0155443 | A1 | 6/2016 | Khan et al. |
| 2016/0189717 | A1 | 6/2016 | Kannan et al. |
| 2017/0357478 | A1* | 12/2017 | Piersol .................. G06F 3/167 |

OTHER PUBLICATIONS

Komando Staff, "Thanks, Google! Now your phone can listen in on you almost all the time", http://www.komando.com/happening-now/259807/thanks-google-now-your-phone-can-listen-in-on-you-almost-all-the-time/all, KOMANDO, Jun. 27, 2014, 2 pages.

Anonymous, "How to Make Your Smartphone, Computer, or Tablet Always Listen for Voice Commands", http://www.howtogeek.com/210998/how-to-make-your-smartphone-computer-or-tablet-always-listen-for-voice-commands, How To Geek, Accessed Mar. 31, 2017, 5 pages.

Barrett, "Tech That's Always Listening Isn't Always Creepy", http://www.wired.com/2015/03/always-listening-tech-isnt-always-creepy/, WIRED, Mar. 17, 2015, 6 pages.

Darnestown,"Will iPhone 6 have Siri always listening?", http://store.apple.com/us/question/answers/iphone/will-iphone-6-have-siri-always-listening/Q44FAF77DD4CA4DKH, Apple, Sep. 9, 2014, 2 pages.

Goldman, "Your Samsung TV is eavesdropping on your private conversations", http://money.cnn.com/2015/02/09/technology/security/samsung-smart-tv-privacy/, CNNtech, Feb. 10, 2015, 4 pages.

Anonymous, "Voice-Recognition Commands", http://www.gm.ca/media/infotainment/chevrolet/en/Chevy_MyLink_VoiceCommands_5.pdf, Chevrolet My Link, Accessed Mar. 31, 2017, 2 pages.

Stroud, "Siri Eyes Free", http://www.webopedia.com/TERM/S/siri_eyes_free.html, Webopedia, Accessed Mar. 31, 2017, 4 pages.

Anonymous, "Siri Eyes Free for Chevrolet Spark & Sonic Frequently Asked Questions", Chevrolet, Accessed Mar. 31, 2017, 1 page.

Mell et al., "The NIST Definition of Cloud Computing", NIST, Special Publication 800-145, Sep. 2011, 7 pages.

List of IBM Patents or Patent Applications Treated as Related dated Feb. 19, 2019, 1 page.

Specification "Coordinating the Execution of a Voice Command Across Multiple Connected Devices" and Drawings in related U.S. Appl. No. 16/274,589 filed Feb. 13, 2019, 55 pages.

* cited by examiner

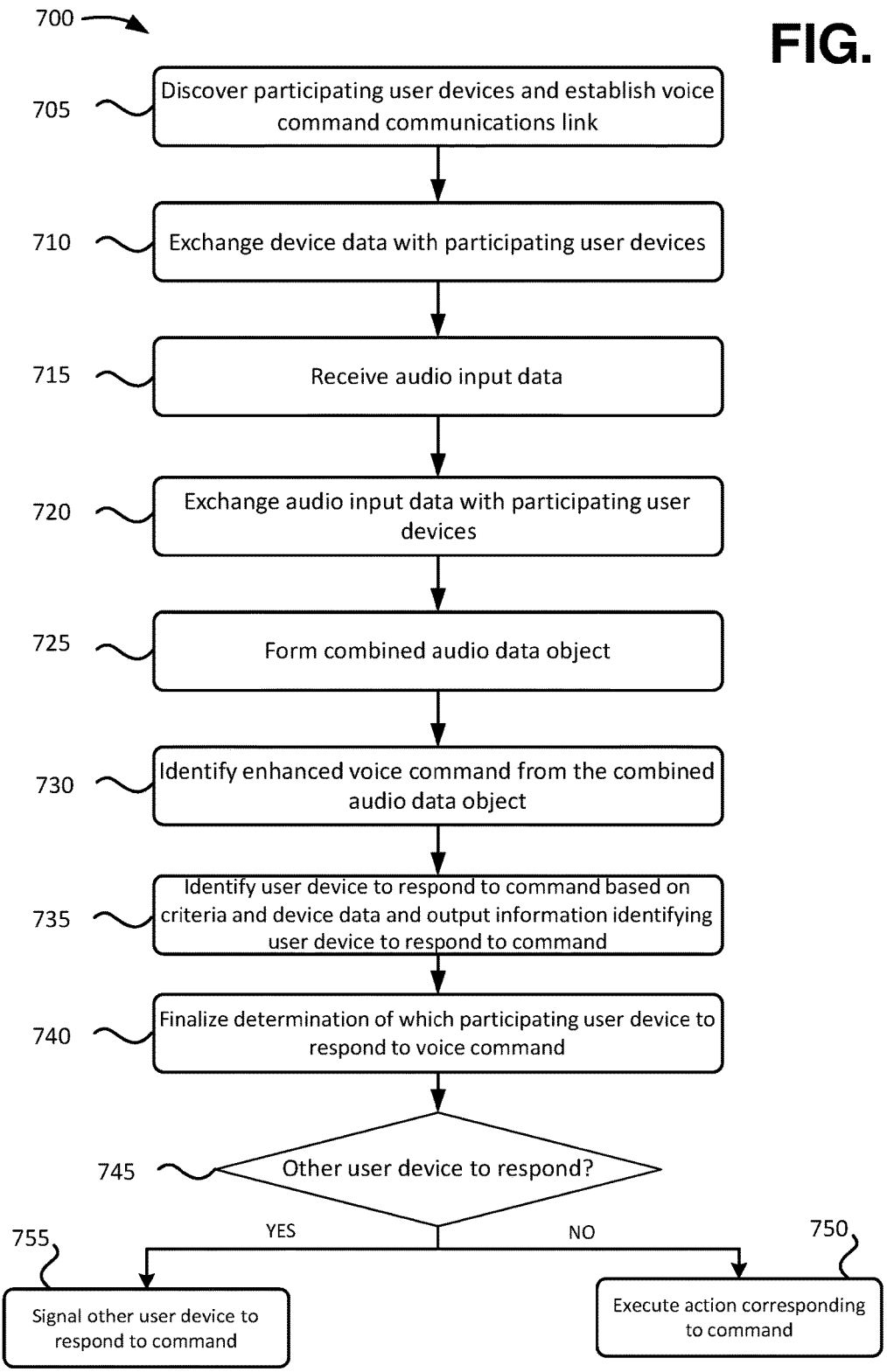

COORDINATING THE EXECUTION OF A VOICE COMMAND ACROSS MULTIPLE CONNECTED DEVICES

BACKGROUND

The present invention generally relates to recognizing and executing voice commands and, more particularly, to recognizing and coordinating the execution of voice commands across multiple connected devices.

A user device (e.g., smart phone, tablet, personal assistant device, television, etc.) may include voice recognition capabilities in which the user device may respond to a voice command by performing a corresponding action on the user device (e.g., playing of audio or video content, executing a web search, determining directions, controlling a connected device, such as lights, climate controllers, etc.). As user devices with voice recognition capabilities become more prevalent, multiple user devices may be implemented or located within relatively short range of each other in which audio from a voice command may be "heard" or received by the user devices. In other words, at any one time, a single user may be carrying (or near) more than one user device having voice recognition capabilities (e.g., when user devices are implemented in a car, at home, office, etc.). As such, a situation may arise in which multiple user devices may each receive a single voice command from the user, which may result in multiple user devices inadvertently responding to the voice command.

Current systems lack a technique for determining which user device should respond to a voice command. Accordingly, there is a need for a system to analyze relevant data for determining which user device should respond to a voice command.

SUMMARY

In an aspect of the invention, a computer-implemented method includes: exchanging, by a first participating user device, device data, associated with the first participating user device, with the one or more second participating user devices; receiving, by the first participating user device, audio data associated with a voice command; exchanging, by the first participating user device, the audio data with the one or more second participating user devices; identifying, by the first participating user device, a voice command based on exchanging the audio data; determining, by the first participating user device, which one of the first participating user device or the one or more second participating user devices should respond to the voice command based on details of the voice command and the exchanging the device data; responding, by the first participating user device, to the voice command based on determining that the first participating user device should respond to the voice command; and signaling, by the first participating user device, a particular second participating user device to respond to the voice command based on determining that the particular second participating user device should respond to the voice command. Advantageously, aspects of the present invention may determine which participating user device should respond to a voice command, preventing other user devices from inadvertently responding to the voice command. Aspects of the present invention may also form a combined audio data object based on the exchanging the audio data, wherein the combined audio data object includes most audibly legible portions of audio data obtained by each of the first participating user devices and the one or more second participating user devices.

In an aspect of the invention, there is a computer program product for improving the performance of recognizing and executing voice commands. The computer program product includes a computer readable storage medium having program instructions embodied therewith, the program instructions executable by a first participating user device to cause the first participating user device to: establish a communications link with one or more second participating user devices; exchange, via the communications link, device data, associated with the first participating user device, with the one or more second participating user devices; receive audio data associated with a voice command; determine which one of the first participating user device or the one or more second participating user devices should respond to the voice command based on details of the voice command and the exchanging the device data; respond to the voice command based on determining that the first participating user device should respond to the enhanced voice command; and signal a particular second participating user device to respond to the voice command based on determining that the particular second participating user device should responds to the voice command. Advantageously, aspects of the present invention may determine which participating user device should respond to a voice command, preventing other user devices from inadvertently responding to the voice command. In accordance with aspects of the present invention, the establishing the communications link is based on security policies permitting the establishing the communications link to be established with the one or more second user devices.

In an aspect of the invention, a system includes: a CPU, a computer readable memory and a computer readable storage medium associated with a first participating user device; program instructions to establish a communications link with one or more second participating user devices; program instructions to receive audio data associated with a voice command; program instructions to exchange, via the communications link, the audio data with the one or more second participating user devices; program instructions to form a combined audio data object based on the exchanging the audio data; program instructions to identify an enhanced voice command from the combined audio data object; program instructions to determining which one of the first participating user device or the one or more second participating user devices should respond to the enhanced voice command based on details of the enhanced voice command; program instructions to respond to the enhanced voice command based on determining that the first participating user device should respond to the enhanced voice command; and program instructions to signal a particular second participating user device to respond to the enhanced voice command based on determining that the particular second participating user device should responds to the enhanced voice command. The program instructions are stored on the computer readable storage medium for execution by the CPU via the computer readable memory. Advantageously, aspects of the present invention may determine which participating user device should respond to a voice command, preventing other user devices from inadvertently responding to the voice command. In accordance with aspects of the present invention, the combined audio data object includes most audibly legible portions of audio data obtained by each of the first participating user devices and the one or more second participating user devices.

BRIEF DESCRIPTION OF THE DRAWINGS

The present invention is described in the detailed description which follows, in reference to the noted plurality of drawings by way of non-limiting examples of exemplary embodiments of the present invention.

FIG. 7 shows an example flowchart of a process for coordinating the response to a voice command among a group of user devices in accordance with aspects of the present invention.

DETAILED DESCRIPTION

Figure 1:
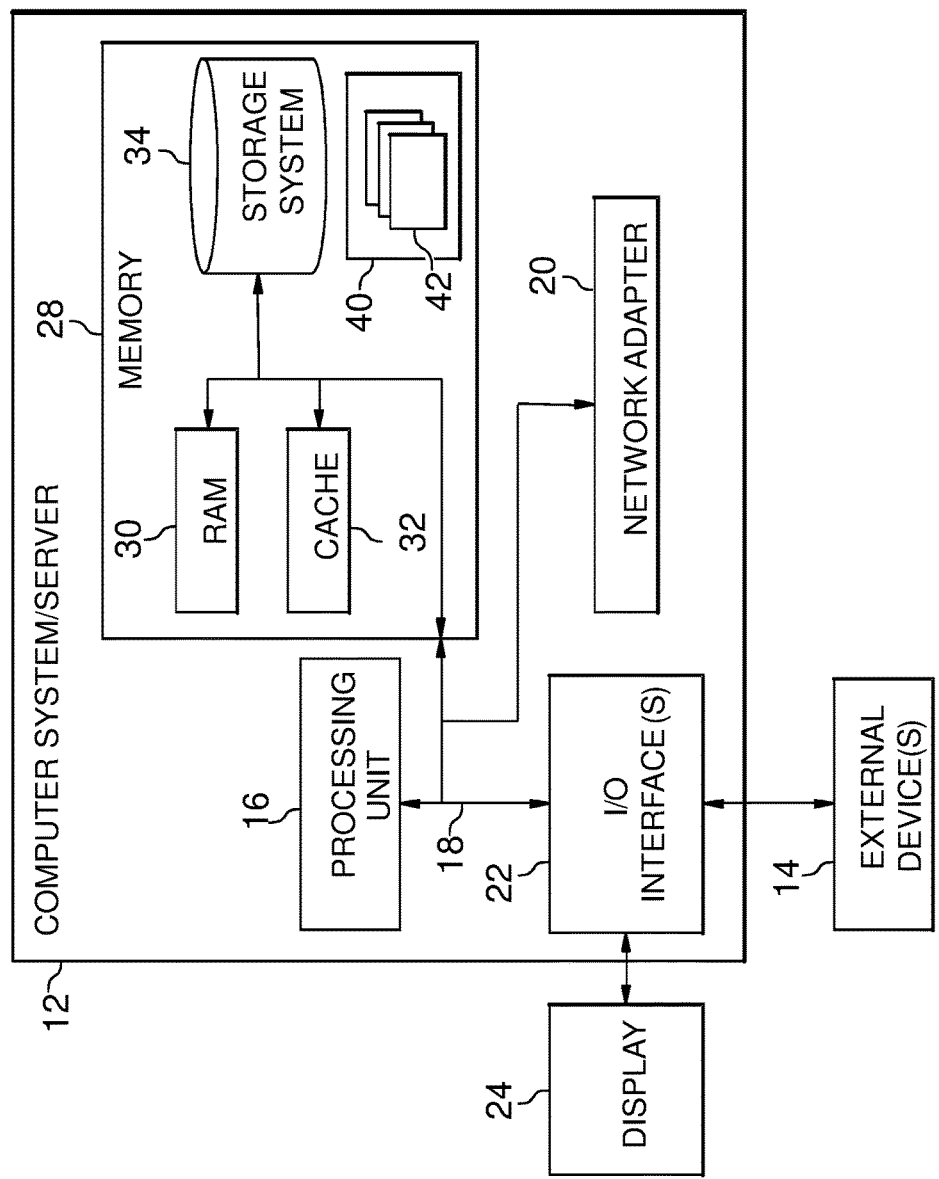
FIG. 1 depicts a cloud computing node according to an embodiment of the present invention.

The present invention generally relates to recognizing and executing voice commands and, more particularly, to recognizing and coordinating the execution of voice commands across multiple connected devices. At any one time, a single user may be carrying (or near) more than one user device having voice recognition capabilities (e.g., when user devices are implemented in a car, at home, office, etc.). As such, a situation may arise in which multiple user devices may each receive a single voice command from the user, which may result in multiple user devices inadvertently responding to the voice command.

Accordingly, aspects of the present invention may connect multiple user devices together to create a voice command communications link in which the connected multiple user devices may communicate with each other to determine which user device, of the multiple user devices, should execute the command. Additionally, aspects of the present invention may improve the recognition of a voice command by combining together the most audibly decipherable portions of audio data received by each of multiple distributed user devices to form a combined audio data object. As such, accuracy of voice command recognition is improved, thereby improving the accuracy of executing intended voice commands. Further, the user devices may analyze the command identified in the combined audio data object and determine which user device, of the multiple user devices, should execute the command.

As described herein, aspects of the present invention may provide a technical solution to the technical problem of determining which user device should execute a voice command. For example, aspects of the present invention may solve the above technical problem based on device profiles shared by each of multiple user devices, user device settings, activity information, audio data heard, keywords, etc. As a specific, non-limiting example, aspects of the present invention may determine that a user device that is currently playing music should respond to a voice command to skip a music track, whereas another user device that is not currently playing music should not respond to such a command. As another example, aspects of the present invention may provide a technical solution to the above-mentioned technical problem by determining that a user device that is currently playing music should respond to a voice command to adjust a volume setting, whereas another user device that is not currently playing music should not respond to such a command. As another example, aspects of the present invention may provide a technical solution to the above-mentioned technical problem by determining that a particular user device should respond to a voice command based on recognizing a particular individual that has given the command (e.g., based on voice recognition techniques). As another example, aspects of the present invention may provide a technical solution to the above-mentioned technical problem by determining that a particular user device should respond to a voice command based on the capabilities of the user device and the nature of the command. Specifically, aspects of the present invention may determine that a particular user device that is connected and registered to a home automation controller should respond to a verbal command relating to controlling a setting via the home automation controller. As described herein, priority rules, criteria, user preferences, and/or conflict resolution rules may be used to identify which device should respond to a verbal command.

As described herein, different types of user devices may respond to different keywords. For example, keywords may include a "wake" command that instructs a user device to respond to subsequent a voice input spoken shortly after the wake command. Additionally, or alternatively, keywords may define the type of command to execute based on the capabilities or operating system of the user device. Additionally, or alternatively, keywords may include predefined phrases that instruct a user device to perform a corresponding action. In embodiments, multiple user devices may share keywords with each other in order to improve the responsiveness of voice commands, and to determine which device should respond to a command. As an example, if a first user device "hears" a keyword or phrase associated with a second user device, but the second user device does not "hear" the keyword or phrase, the first user device may provide the second user device with an indication that the keyword or phrase was heard by the first user device. Accordingly, the second user device may perform a corresponding action even if the second user device did not sufficiently "hear" the keyword.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
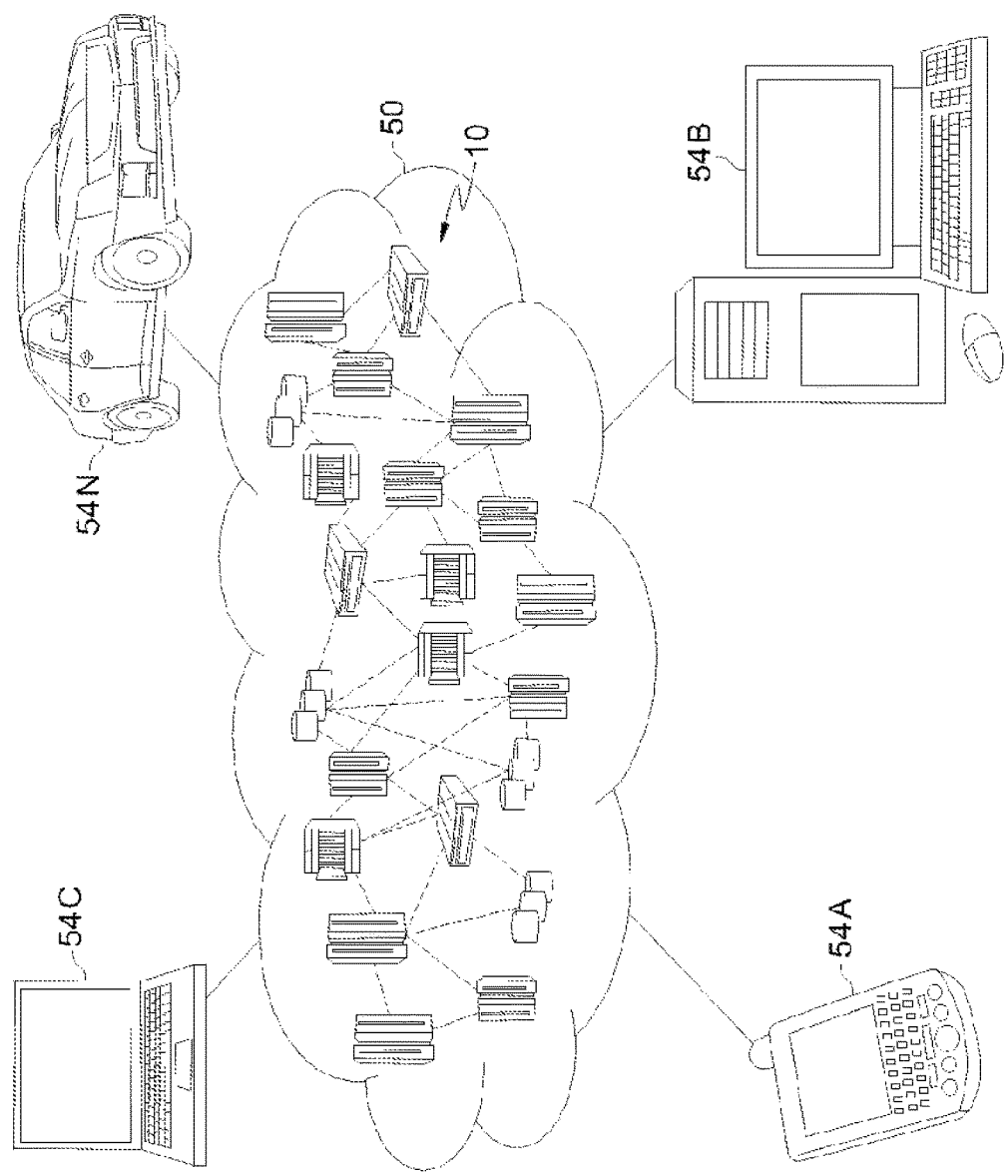
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
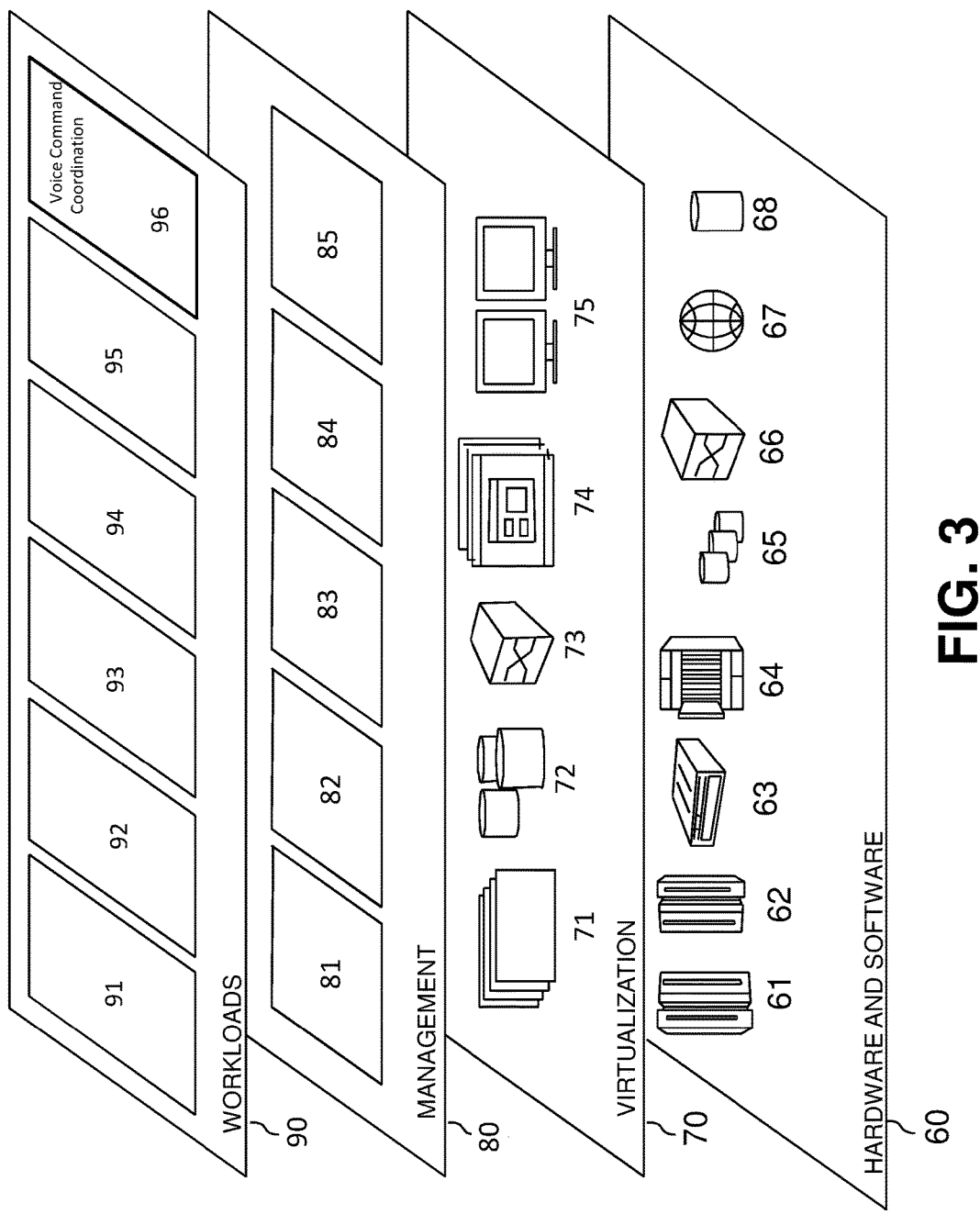
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice command coordination 96.

Figure 5:
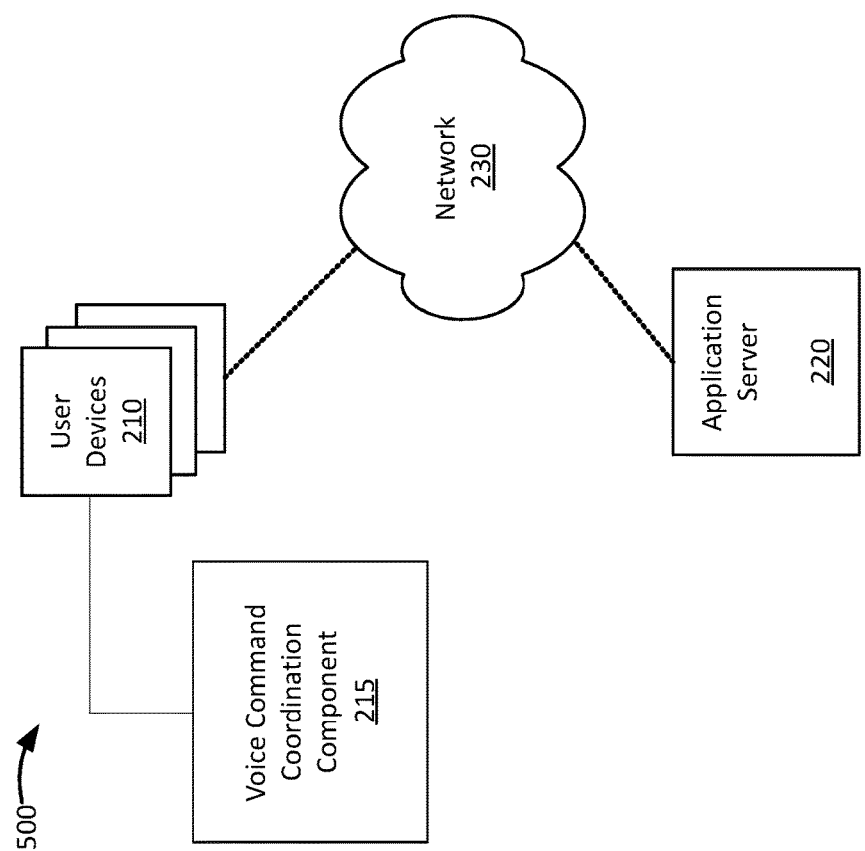
FIG. 5 shows an example environment in accordance with aspects of the present invention.

Referring back to FIG. 1, the program/utility 40 may include one or more program modules 42 that generally carry out the functions and/or methodologies of embodiments of the invention as described herein (e.g., such as the functionality provided by voice command coordination 96). Specifically, the program modules 42 may establish a voice command communications link with other user devices, exchange device data, receive audio input data, exchange audio data with other user devices, form a combined audio data object, identify a command included in the combined audio data object, identify a device to respond to the command based on criteria and device data, and determine which user device in the communications link with which to execute the command. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a voice command coordination component as shown in FIG. 5.

Figure 4A:
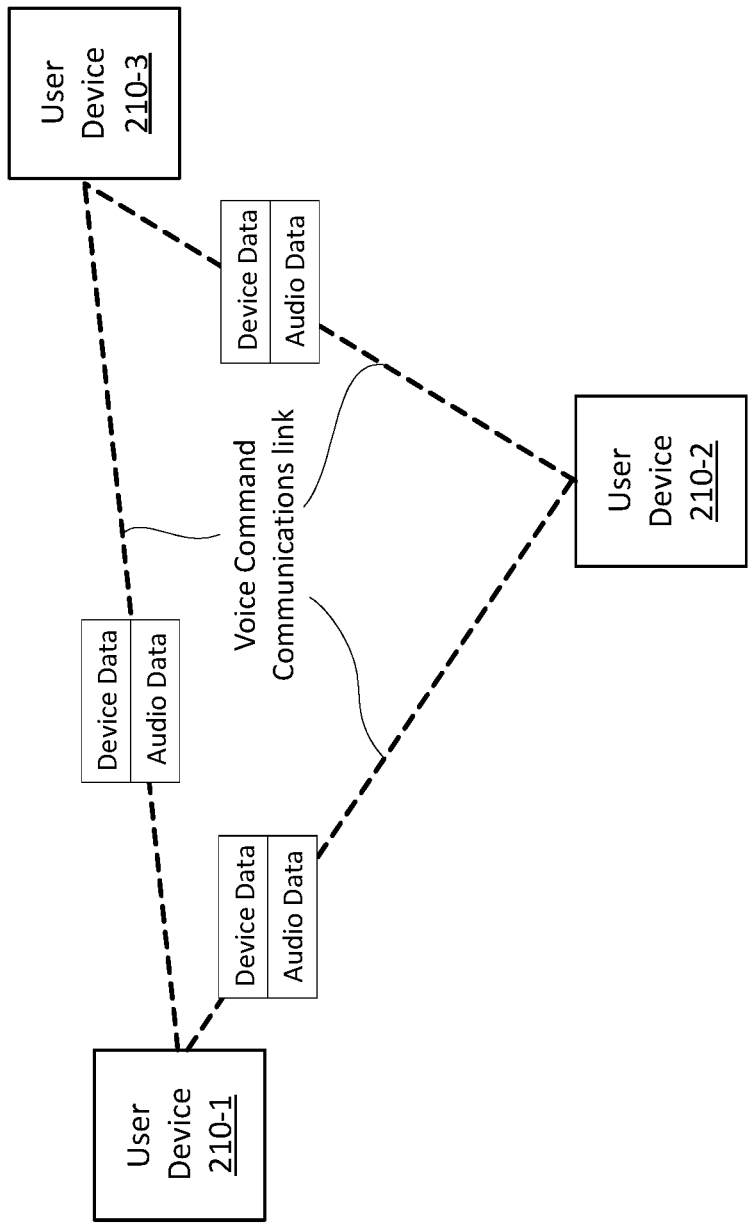
FIGS. 4A-4C show an overview of an example implementation in accordance with aspects of the present invention
Figure 4A:
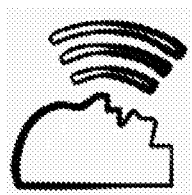
Figure 4B:
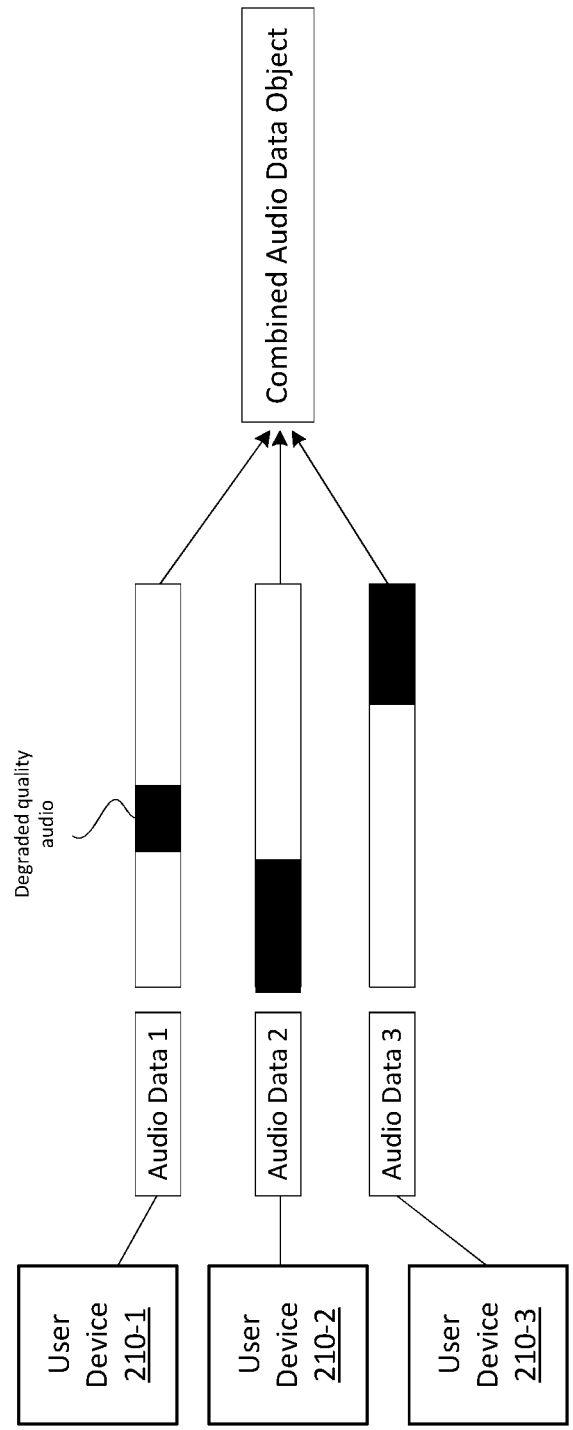
Figure 4C:
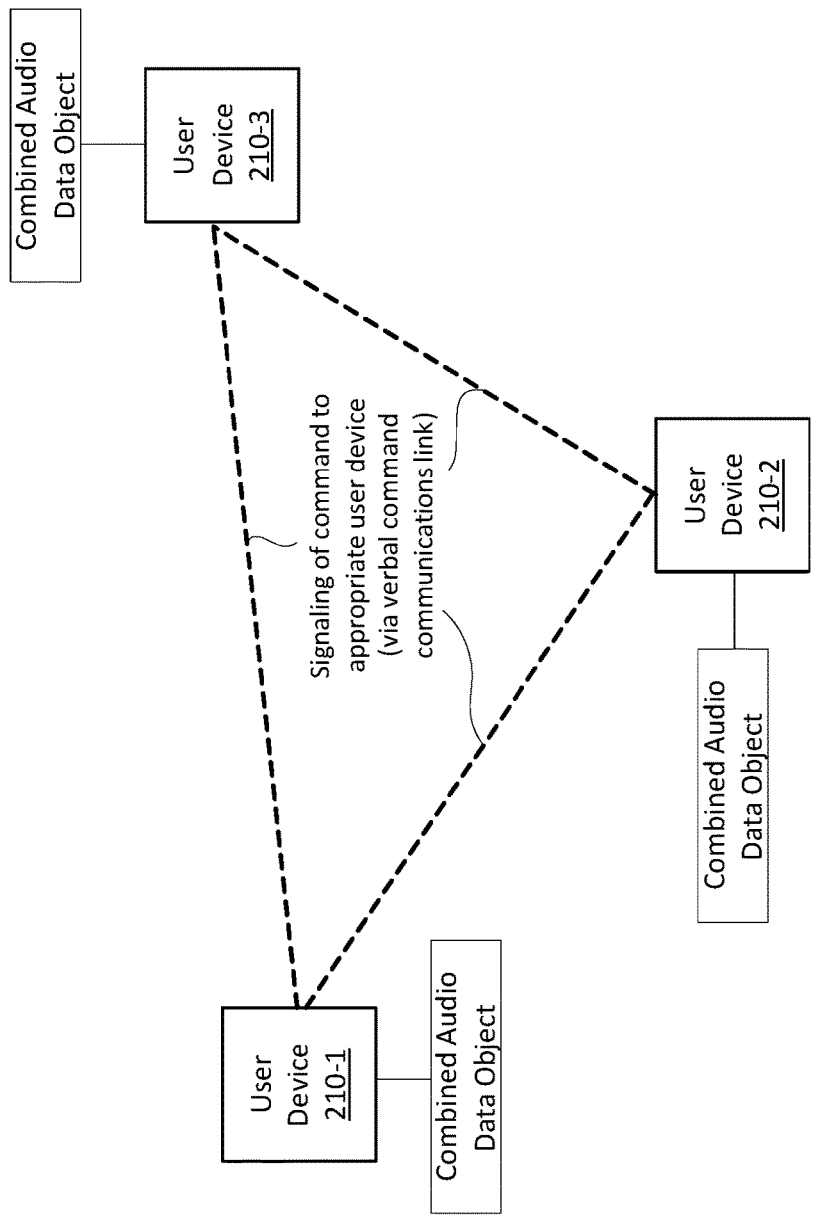

FIGS. 4A-4C show an overview of an example implementation in accordance with aspects of the present invention. As shown in FIG. 4A, a group of user devices 210 (e.g., user device 210-1, user device 210-2, and user device 210-3) may establish a voice command communications link with each other via a suitable communications network or connection protocol (e.g., via a personal area network (PAN), local area network (LAN), etc.). In embodiments, the voice command communications link may be established between user devices 210 that have a previously established trust relationship and when the user devices 210 are within a threshold proximity of each other (e.g., as identified based on location determination techniques). As described herein, the voice command communications link may be established in order for multiple user devices 210 to coordinate the execution of a voice command when the voice command is "heard" (e.g., when audio is received via an audio input device/microphone) by the multiple user devices 210 (e.g., in a situation in which the multiple user devices 210 are located in relatively close proximity to each other, such as when the multiple user devices 210 are located in the same room). For example, in a typical situation, each of the multiple user devices 210 may "hear" a voice command, and may each attempt to respond to the voice command, even when the user only intends for one of the user devices 210 to respond to the command. Accordingly, the voice command communications link may be established in order for multiple user devices 210 to coordinate the execution of a voice command when the voice command is "heard." Also, as described herein, the voice command communications link may be established in order to improve the recognition of a voice command.

Continuing with the above, after establishing the communications link, each of user device 210-1, user device 210-2, and user device 210-3 may share device data with each other. As described herein, the device data may include device activity information (e.g., programs that are running on each user device 210). The device data may also include keywords (e.g., words, phrases, wake commands, etc.) to which each device is configured to respond. For example, different user devices may operate on different operating systems that are pre-configured to respond to a different set of keywords, phrases, or voice commands. As described herein, sharing of keywords may better coordinate the execution of a spoken command (e.g., by signaling the command, by a user device that "heard" the command, to a user device that did not "hear" the command, but should respond to the command). As further shown in FIG. 4A, each of user device 210-1, user device 210-2, and user device 210-3 may share audio data (e.g., audio data that is associated with a verbal command spoken by a user and received by audio input devices implemented by each user device 210). As described herein, sharing of the audio data may improve the recognition of the verbal command as well as the responsiveness to the verbal command.

As shown in FIG. 4B, the most audibly legible or highest quality portions of audio data received by each of user device 210-1, user device 210-2, and user device 210-3 may be combined to form a combined audio data object. For example, as shown in FIG. 4B, a portion of degraded audio quality data from audio data 1 (e.g., audio data from user device 210-1) may be replaced with a portion of higher quality or more audibly legible audio data from audio data 2 or audio data 3. In this way, the combined audio data object includes only the audio from the highest quality portions of audio data received across all user devices 210. In embodiments, each user device 210 may form a combined audio data object based on the sharing of audio data. Alternatively, a designated "master" user device 210 may form the combined audio data object and provide the combined audio data object to the other user devices 210 in the verbal command communications link. In this way, recognition of a command may be improved since the combined audio data object includes highest quality portions of audio data received across multiple user devices 210.

As shown in FIG. 4C, each of user device 210-1, user device 210-2, and user device 210-3 may signal a command (e.g., as recognized from the combined audio data object), to an appropriate user device 210 that should respond to the command. As described herein, the user device 210 that should respond to the command may be determined based on the device data (e.g., the keywords, device activity), the nature of the command or type of command, and/or other criteria. In embodiments, each user device 210 may determine which user device 210 should respond to the command, and may signal that user device 210 to respond to the command. A particular user device 210 that receives a signaling message from majority of the user devices 210 in the verbal command communications link may respond to the command. Alternatively, in one embodiment, a designated "master" user device 210 may determine which user device 210 should respond to the command, and instruct the determined user device 210 to respond to the command.

As a specific, non-limiting example, aspects of the present invention may determine that a user device 210 that is currently playing music should respond to a voice command to skip a music track, whereas another user device 210 that is not currently playing music should not respond to such a command. As another example, aspects of the present invention may determine that a user device that is currently playing music should respond to a voice command to adjust a volume setting, whereas another user device 210 that is not currently playing music should not respond to such a command. As another example, aspects of the present invention may determine that a particular user device 210 should respond to a voice command based on recognizing a particular individual that has given the command (e.g., based on voice recognition techniques). As described herein, priority rules, criteria, user preferences, and/or conflict resolution rules may be used to identify which user device 210 device should respond to a verbal command. In this way, recognition of a verbal command is improved, as well as the coordination of responding to or executing the verbal command by an appropriate user device 210 in a situation in which multiple user devices 210 "hear" a command (e.g., when the user devices 210 are within relatively close proximity to each other).

FIG. 5 shows an example environment in accordance with aspects of the present invention. As shown in FIG. 5, environment 500 may include user devices 210 (referred to individually as "user device 210" or collectively as "user devices 210"), application server 220, and network 230. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a computing device capable of communicating via a network, such as the network 230. For example, the user device 210 may correspond to a mobile communication device (e.g., a smart phone or a personal digital assistant (PDA)), a portable computer device (e.g., a laptop or a tablet computer), or another type of device. In some embodiments, the user device 210 may include one or more audio input devices (e.g., microphones) to receive audio input, such as a verbal command from a user. The user device 210 may include a voice command response system to respond to and/or execute verbal commands.

As further shown in FIG. 5 each user device 210 may include a voice command coordination component 215. The voice command coordination component 215 may perform one or more functions relating to the establishment of a verbal command communications link, joining an existing verbal command communications link, and sharing keywords, device data, and/or audio data. The voice command coordination component 215 may also create a combined audio data object, and determine which user device 210 in a group of user devices 210 connected via the verbal command communications link should respond to a verbal command.

The application server 220 may include one or more computing devices (e.g., such as computer system/server 12 of FIG. 1) that communicates with the user device 210 in connection with performing a task associated with a voice command. For example, the application server 220 may include a searching system, a web server, a device controller, or the like. The user device 210 may communicate with the application server 220 to perform a task, such as performing a search, adjusting settings on an automation device via a controller, etc.

The network 230 may include one or more types of computer networks relating to a verbal command communications link between one or more user devices 210. In embodiments, the network 230 may include network nodes, such as network nodes 10 of FIG. 2. Additionally, or alternatively, the network 230 may include one or more wired and/or wireless networks. For example, the network 230 may include a PAN (e.g., including BLUETOOTH and/or other types of personal area networks), a Near-Field Communications (NFC) network, a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
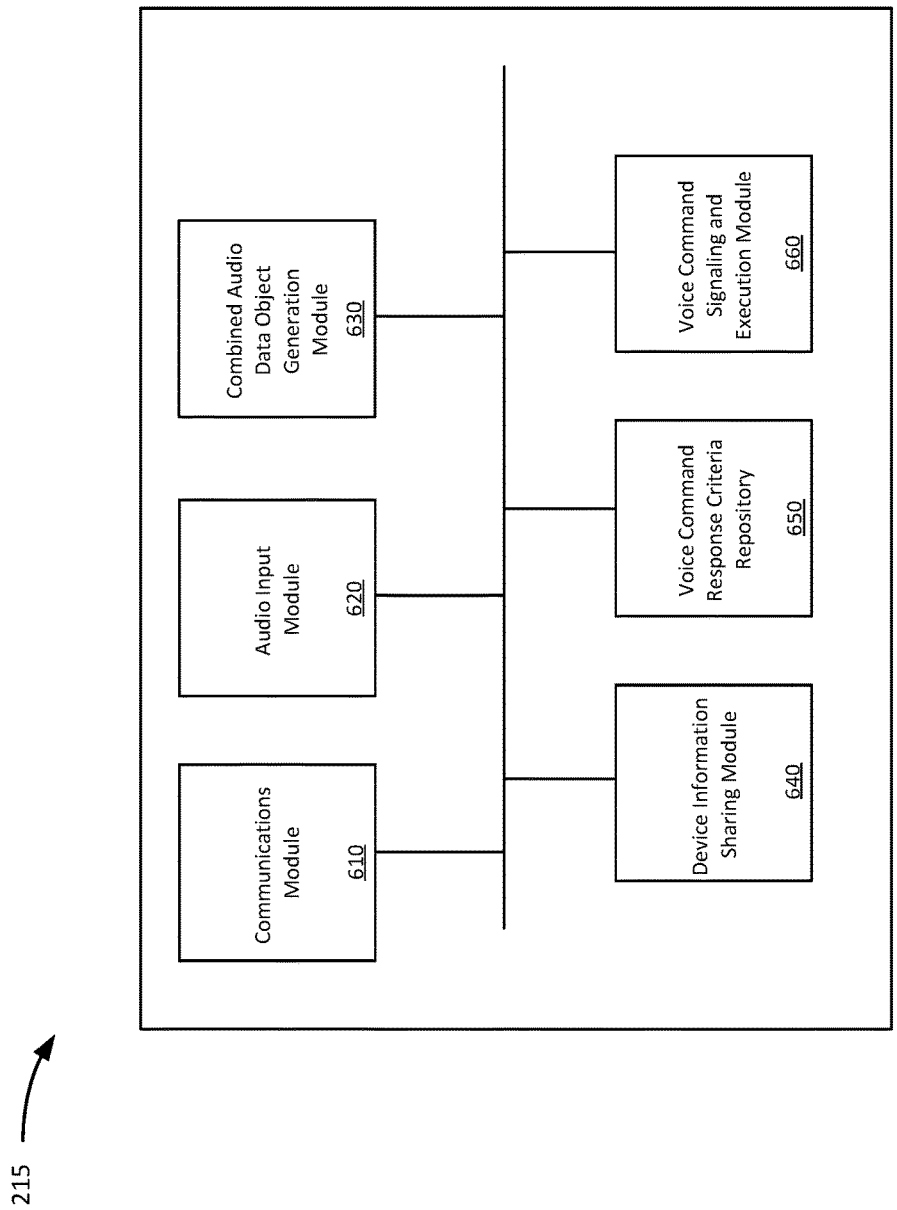
FIG. 6 shows a block diagram of example components of a voice command coordination component in accordance with aspects of the present invention.

FIG. 6 shows a block diagram of example components of a voice command coordination component in accordance with aspects of the present invention. As shown in FIG. 6, the voice command coordination component 215 may include a communications module 610, an audio input module 620, a combined audio data object generation module 630, a device information sharing module 640, a voice command response criteria repository 650, and a voice command signaling and execution module 660. In embodiments, the voice command coordination component 215 may include additional or fewer components than those shown in FIG. 6. In embodiments, separate components may be integrated into a single computing component or module. Additionally, or alternatively, a single component may be implemented as multiple computing components or modules.

The communications module 610 may include a program module (e.g., program module 42 of FIG. 1) that may be used to establish a verbal command communications link and/or join an existing verbal command communications link. In embodiments, the communications module 610 may establish or join the verbal command communications link based on discovering nearby participating user devices 210 that have been pre-configured or instructed by a user to participate in a verbal command communications link. In embodiments, the communications module 610 may discover the participating user devices 210 via a network (e.g., LAN, a PAN, an NFC network, etc.). The communications module 610 may store information identifying particular user devices 210 that have previously established trust relationships and may establish or join a verbal command communications link with these user devices 210. In embodiments, the communications module 610 may establish or join the verbal command communications link when the user device 210 associated with the communications module 610 is located within a threshold distance of other participating user devices 210. As described herein, audio input data may be shared via the voice command communications link. Additionally, or alternatively, device data may be shared via the voice command communications link (e.g., device activity information, device-specific commands, device-specific keywords, device capabilities, etc.).

The audio input module 620 may include a program module (e.g., program module 42 of FIG. 1) that may receive audio input data (e.g., from an audio input component, such as a microphone). The audio input module 620 may provide the audio data to the communications module 610 for sharing received audio data (e.g., corresponding to voice commands) to the communications module 610. In embodiments, the audio input module 620 may implement background noise cancellation techniques in order to improve the quality of audio data shared via the communications module 610.

The combined audio data object generation module 630 may include a program module (e.g., program module 42 of FIG. 1) that may receive audio input data shared by other user devices 210 via the communications module 610 (e.g., user devices 210 that are in communication with each other via a voice command communications link). The combined audio data object generation module 630 may combine multiple audio data objects or streams into a single combined audio data object by retaining the most audibly legible (e.g., audibly decipherable) portions of audio "heard" across all the user devices 210. In embodiments, the combined audio data object generation module 630 may identify the most audibly legible portions based on audio analysis techniques. More specifically, the combined audio data object generation module 630 may identify illegible portions by comparing voiceprints associated with the audio data to voiceprints of static, background noise, and/or other obstructions that are consistent with illegible audio. Additionally, or alternatively, the combined audio data object generation module 630 may identify audibly illegible portions based on volume levels (e.g., portions of the audio that are less than a particular volume may be considered audibly illegible). In embodiments, the combined audio data object generation module 630 may score portions of the audio data (e.g., score each second or half-second of audio data) based on a level of legibility. The combined audio data object generation module 630 may retain the highest scored portions of audio data received or "heard" across all user devices 210 to form a combined audio data object that includes only the most audibly legible portions of audio. As described herein, the combined audio data object may be used to identify a voice command and perform a corresponding action by an identified user device 210 connected in the voice command communications link.

The device information sharing module 640 may include a program module (e.g., program module 42 of FIG. 1) that may share device information about the user device 210 to other user devices 210 connected to the voice command communications link. For example, the device information sharing module 640 may share the device information via the communications module 610. In embodiments, the device information sharing module 640 may share device information, such as device activity information, device-specific commands, device-specific keywords, device capabilities, etc. As described herein, the device information may be used to identify which device should respond to a voice command.

The voice command response criteria repository 650 may include a data storage device (e.g., storage system 34 of FIG. 1) that stores criteria stipulating which user device 210 connected to the voice communications link should respond to a voice command (e.g., a voice command included in the combined audio data object). For example, the voice command response criteria repository 650 may store criteria that stipulate conditions under which one user device 210 should responds to the voice command over another user device. More specifically, the voice command response criteria repository 650 may store criteria that stipulate that one user device 210 versus another user device 210 should respond to a voice command based on the nature, type, or content of the voice command, the current activity of the user devices 210, the keywords/phrases that are associated with the user devices 210, relationships with the user devices 210 to other devices (e.g., home automation control devices) etc.

As a specific, non-limiting example, the voice command response criteria repository 650 may store criteria that stipulate that a user device 210 that is currently playing music should respond to a voice command to adjust a volume setting, whereas another user device 210 that is not currently playing music should not respond to such a command. As another example, the voice command response criteria repository 650 may store criteria that stipulate that a particular user device 210 should respond to a voice command based on recognizing a particular individual that has given the command (e.g., based on voice recognition techniques). As another example, the voice command response criteria repository 650 may store criteria that stipulate that a particular user device 210 should respond to a voice command based on the capabilities of that user device 210 (e.g., a user device 210 that has an association with a home automation component should respond to a voice command). As another example, the voice command response criteria repository 650 may store criteria that stipulate that a particular user device 210 should respond to a voice command based on the keywords or phrases associated with that user device 210. In this way, the best-suited user device 210 will respond to the voice command whereas other user devices 210 may not respond to the voice command, thereby preventing duplicative execution of the voice command, and also preventing erroneous responses to the voice command.

In embodiments, the voice command response criteria repository 650 may include scoring criteria in order to score each user device 210 connected to the voice command communications link. As described herein, the score may indicate a level of suitability for each user device 210 to respond to the voice command. The user device 210 having the highest score may be directed to execute the voice command. As described herein, the scoring may be based on the content/type of voice command, current activity of each user device 210, the capabilities of each user device 210, the keywords/phrases associated with each user device 210, relationships with other connected devices, etc. Scores may be relatively higher for user devices 210 whose capabilities, more closely match the current activity, capabilities, keywords/phrases, relationships with other devices, etc.

The voice command signaling and execution module 660 may include a program module (e.g., program module 42 of FIG. 1) that may determine which user device 210 connected to the voice command communications link should respond to a voice command from the combined audio data object based on the information stored by the voice command response criteria repository 650. For example, the voice command signaling and execution module 660 may identify a voice command from the combined audio data object using speech recognition and/or natural language processing techniques. In embodiments, the voice command signaling and execution module 660 may signal, to the other user devices 210, which user device 210 should respond to the voice command. The voice command signaling and execution module 660 may receive signals from other user devices 210. The voice command signaling and execution module 660 for each user device 210 may then coordinate with each other to determine which user device 210 should execute the command based on, for example, a "voting" system in which the user device 210 that receives a majority of "votes" to respond to the voice command will be the user device 210 to respond to the command. Alternatively, a particular user device 210 may be designated as a "master" that will make a final decision as to which user device 210 should respond to a voice command based on the signals received from each of the other user devices 210. In embodiments, the voice command signaling and execution module 660 may score each user device 210 based on the information stored by the voice command response criteria repository 650, and may share the scores with other user devices 210 to determine which user device 210 should respond to a voice command (e.g., based on an average of the scores received for each user device 210).

As an illustrative example, the voice command signaling and execution module 660 of user device 210-1 may receive, from voice command signaling and execution module 660*s* of other user devices 210, signals that indicate that the user device 210-1 should respond to a voice command. The voice command signaling and execution module 660 of user device 210-1 may also determine that itself should respond to the voice command. Accordingly, the voice command signaling and execution module 660 of user device 210-1 may execute an action in response to the voice command.

As another example, the voice command signaling and execution module 660 of user device 210-1 may determine that it should respond to a voice command rather than other user devices 210 in a situation in which the user device 210-1 did not initially "hear" the voice command, but extracted the voice command form a combined audio data object that was generated based on the other user devices 210 "hearing" the voice command. For example, if the voice command includes a keyword specific to the user device 210-1, but the user device 210-1 did not "hear" the voice command, the user device 210-1 may still respond to the voice command based on extracting the voice command from the combined audio data object and by receiving signals from the other user devices 210 that user device 210-1 should respond to the voice command.

FIG. 7 shows an example flowchart of a process for coordinating the response to a voice command among a group of user devices in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include discovering participating user devices and establish voice command communications link (step 705). For example, as described above with respect to the communications module 610, the voice command coordination component 215 associated with a user device 210-1 may establish a voice command communications link and/or join an existing voice command communications link. In embodiments, the voice command coordination component 215 may establish or join the voice command communications link based on discovering nearby participating user devices 210 that have been pre-configured or instructed by a user to participate in a voice command communications link. In embodiments, the voice may discover the participating user devices 210 via a network (e.g., LAN, a PAN, an NFC network, etc.). In embodiments, the voice command coordination component 215 may establish or join the verbal command communications link when user device 210-1 and participating user devices 210 are located within a threshold distance of each other.

Process 700 may also include exchanging device data with participating user devices (step 710). For example, as described above with respect to the device information sharing module 640, voice command coordination component 215 may share device information about the user device 210-1 to other participating user devices 210 connected to the voice command communications link. For example, the voice command coordination component 215 may share the device information via the communications module 610. In embodiments, the voice command coordination component 215 may share device information, such as device activity information, device-specific commands, device-specific keywords, device capabilities, etc.

Process 700 may further include receiving audio input data (step 715). For example, as described above with respect to the combined audio data object generation module 630, voice command coordination component 215 may receive audio input data (e.g., from an audio input component, such as a microphone). In embodiments, the voice command coordination component 215 may implement background noise cancellation techniques in order to improve the quality of audio data shared via the communications module 610.

Process 700 may also include exchanging audio input data with participating user devices (step 720). For example, as described above with respect to the combined audio data object generation module 630, voice command coordination component 215 may exchange audio input data with other participating user devices 210 (e.g., user devices 210 connected to the voice command communications link).

Process 700 may further include forming a combined audio data object (step 725). For example, as described above with respect to the combined audio data object generation module 630, voice command coordination component 215 may combine multiple audio data objects or streams into a single combined audio data object by retaining the most audibly legible portions of audio "heard" across the user device 210-1 and other participating user devices 210. In embodiments, the voice command coordination component 215 may identify the most audibly legible portions based on audio analysis techniques.

Process 700 may also include identifying an enhanced voice command from the combined audio data object (step 730). For example, as described above with respect to the voice command signaling and execution module 660, voice command coordination component 215 may identify a voice command (e.g., an enhanced voice command) from the combined audio data object using speech recognition and/or natural language processing techniques.

Process 700 may further include identifying a user device to respond to command based on criteria and device data and output information identifying user device to respond to command (step 735). For example, as described above with respect to the voice command signaling and execution module 660, voice command coordination component 215 may determine which participating user device 210 connected to the voice command communications link should respond to a voice command from the combined audio data object based on the information stored by the voice command response criteria repository 650. The voice command coordination component 215 may output information or a signal identifying which participating user device 210 should respond to the voice command. The voice command coordination component 215 may receive information from the other participating user devices 210 that indicate the decisions made by the other participating user devices 210 as to which user devices 210 should respond to the voice command. As described herein, the information identifying which user device 210 to respond to the command may include a scoring value indicating the level of suitability for each of the participating user devices 210 to respond to the voice command.

Process 700 may also include finalizing the determination of which participating user device to respond to voice command (step 740). For example, as described above with respect to the audio input module 620, voice command coordination component 215*s* associated with the user device 210-1 and of each participating user device 210 may communicate with each other to finalize which user device 210 should respond to the command. For example, the voice command coordination component 215*s* may make final determination that the participating user device 210 that received the highest average score should respond to the voice command. Alternatively, a particular participating user device 210 may be designated as a "master" device that may make the final determination as to which participating user device 210 is to respond to the voice command.

Process 700 may further include determining whether another user device is to respond (step 745). For example, the voice command coordination component 215 may determine whether itself is to respond to the command or if another voice command coordination component 215 associated with a participating user device 210 is to respond to the command (e.g., based on the final determination of which participating user device 210 is to respond to the voice command). If another user device is to respond (e.g., other than user device 210-1), process 700 may include, at step 755, signaling the other participating user device 210 that is to respond to the command (e.g., to notify that the other participating user device 210 should respond in the event that the other participating user device 210 did not "hear" or receive the voice command). User device 210-1 may not take any further action on executing or responding to the voice command. If, on the other hand, another user device is not to respond (step 745-NO), process 700 may include executing an action corresponding to the command (step 750). For example, the voice command coordination component 215 may execute the action corresponding to the command.

In accordance with process 700, described herein, each participating user device 210 may share device data, audio data, and/or other data with each other in order to improve voice recognition of a command. Further, process 700 may determine which participating user device 210 should respond to the command, direct that user device 210 to respond to the command, and direct other user devices 210 to ignore the command. In this way, execution of the voice command may only be executed by a single user device 210 in a situation in which multiple user devices 210 may "hear" the command, thus eliminating duplication and/or unintended execution of the voice command by user device 210 that should not respond to the voice command.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    exchanging, by a first participating user device, device data, associated with the first participating user device, with the one or more second participating user devices;
    receiving, by the first participating user device, audio data associated with a voice command;
    exchanging, by the first participating user device, the audio data with the one or more second participating user devices;
    forming, by the first participating user device, a combined audio data object based on the exchanging the audio data, wherein the combined audio data object includes most audibly legible portions of audio data obtained by each of the first participating user devices and the one or more second participating user devices;
    identifying, by the first participating user device, a voice command based on exchanging the audio data;
    determining, by the first participating user device, which one of the first participating user device or the one or more second participating user devices should respond to the voice command based on details of the voice command and the exchanging the device data, the determining further comprising coordinating with the one or more second participating user devices to make a final determination as to which one of the first participating user device or the one or more second participating user devices, should respond to the voice command, wherein the making the final determination is based on scores representing which one of the first participating user device or the one or more second participating user devices, should respond to the voice command;
    responding, by the first participating user device, to the voice command based on determining that the first participating user device should respond to the voice command; and
    signaling, by the first participating user device, a particular second participating user device to notify the particular second participating user device to respond to the voice command based on determining that the particular second participating user device should respond to the voice command.

2. The method of claim 1, wherein the device data is selected from a group consisting of:
    device activity information;
    device keywords;
    device capabilities; and
    relationships and connections with other devices.

3. The method of claim 1, wherein the exchanging the device data includes providing the device data, associated with the first participating user device, to the one or more second participating users via a communications link and receiving, from each of the one or more second participating user devices, device data associated with each of the one or more second participating user devices.

4. The method of claim 1, wherein the exchanging the audio data includes providing the audio data, obtained by the first participating user device, to the one or more second participating users via a communications link and receiving, from each of the one or more second participating user devices, audio data obtained by each of the one or more second participating user devices.

5. The method of claim 1, further comprising establishing a communications link with the one or more second participating user devices, wherein the establishing the communications link comprises discovering the one or more second participating user devices through at least one selected from the group consisting of:
   a local area network;
   a personal area network; and
   a near field communications network.

6. The method of claim 5, wherein the establishing the communications link is based on security policies permitting the establishing the communications link to be established with the one or more second user devices.

7. The method of claim 1, wherein a service provider at least one of creates, maintains, deploys and supports the computing device.

8. The method of claim 1, wherein the establishing the communications link, the exchanging the device data, the receiving the audio data, the exchanging the audio data, the forming the combined audio data object, the identifying the enhanced voice command, the identifying which one of the first participating user device or the one or more second participating user devices should respond to the enhanced voice command, the responding to the enhanced voice command, and the signaling the signaling the particular second participating user device to respond to the enhanced voice command are provided by a service provider on a subscription, advertising, and/or fee basis.

9. The method of claim 1, wherein the computing device includes software provided as a service in a cloud environment.

10. The method of claim 1, further comprising deploying a system for improving the performance of recognizing and executing voice commands, comprising providing a computer infrastructure operable to perform the establishing the communications link, the exchanging the device data, the receiving the audio data, the exchanging the audio data, the forming the combined audio data object, the identifying the enhanced voice command, the identifying which one of the first participating user device or the one or more second participating user devices should respond to the enhanced voice command, the responding to the enhanced voice command, and the signaling the signaling the particular second participating user device to respond to the enhanced voice command.

11. A computer program product for improving the performance of recognizing and executing voice commands, the computer program product comprising a computer readable storage medium having program instructions embodied therewith, the program instructions executable by a first participating user device to cause the first participating user device to:
   establish a communications link with one or more second participating user devices;
   exchange, via the communications link, device data, associated with the first participating user device, with the one or more second participating user devices;
   form a combined audio data object based on the exchanging the audio data, wherein the combined audio data object includes most audibly legible portions of audio data obtained by each of the first participating user devices and the one or more second participating user devices;
   receive audio data associated with a voice command;
   determine which one of the first participating user device or the one or more second participating user devices should respond to the voice command based on details of the voice command and the exchanging the device data, the determining further comprising coordinating with the one or more second participating user devices to make a final determination as to which one of the first participating user device or the one or more second participating user devices, should respond to the voice command, wherein the making the final determination is based on scores representing which one of the first participating user device or the one or more second participating user devices, should respond to the voice command;
   respond to the voice command based on determining that the first participating user device should respond to the enhanced voice command; and
   signal a particular second participating user device to respond to the voice command based on determining that the particular second participating user device should responds to the voice command.

12. The computer program product of claim 11, wherein the device data is selected from a group consisting of:
   device activity information;
   device keywords;
   device capabilities; and
   relationships and connections with other devices.

13. The computer program product of claim 11, wherein the exchanging the device data includes providing the device data, associated with the first participating user device, to the one or more second participating users via the communications link and receiving, from each of the one or more second participating user devices, device data associated with each of the one or more second participating user devices.

14. The computer program product of claim 11, wherein the establishing the communications link with the one or more second participating user devices comprises discovering the one or more second participating user devices through at least one selected from the group consisting of:
   a local area network;
   a personal area network; and
   a near field communications network.

15. The computer program product of claim 14, wherein the establishing the communications link is based on security policies permitting the establishing the communications link to be established with the one or more second user devices.

16. A system comprising:
   a CPU, a computer readable memory and a computer readable storage medium associated with a first participating user device;
   program instructions to establish a communications link with one or more second participating user devices;
   program instructions to receive audio data associated with a voice command;
   program instructions to exchange, via the communications link, the audio data with the one or more second participating user devices;
   program instructions to form a combined audio data object based on the exchanging the audio data, wherein the combined audio data object includes most audibly legible portions of audio data obtained by each of the first participating user devices and the one or more second participating user devices;
   program instructions to identify an enhanced voice command from the combined audio data object;

program instructions to determine which one of the first participating user device or the one or more second participating user devices should respond to the enhanced voice command based on details of the enhanced voice command;

program instructions to coordinate with the one or more second participating user devices to make a final determination as to which one of the first participating user device or the one or more second participating user devices, should respond to the voice command, wherein the making the final determination is based on scores representing which one of the first participating user device or the one or more second participating user devices, should respond to the voice command;

program instructions to respond to the enhanced voice command based on determining that the first participating user device should respond to the enhanced voice command; and program instructions to signal a particular second participating user device to respond to the enhanced voice command based on determining that the particular second participating user device should responds to the enhanced voice command, wherein the program instructions are stored on the computer readable storage medium for execution by the CPU via the computer readable memory.

* * * * *